(No Model.)
H. S. RODGERS.
DYNAMO ELECTRIC MACHINE OR MOTOR.
No. 512,843.  Patented Jan. 16, 1894.
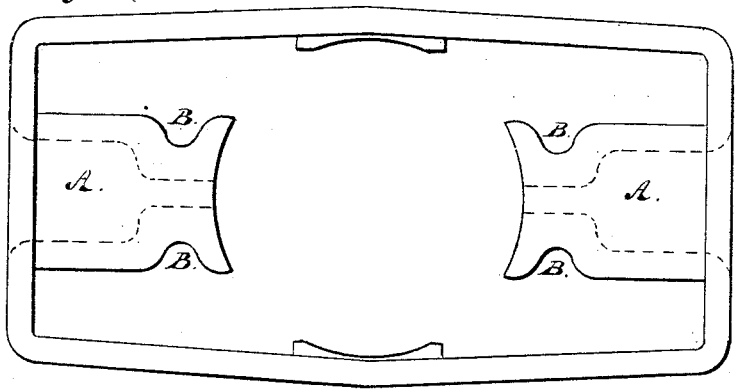
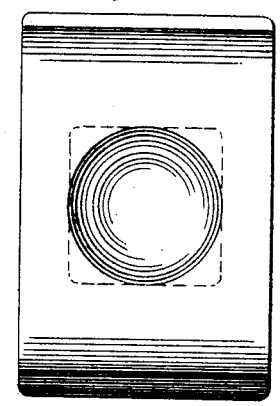
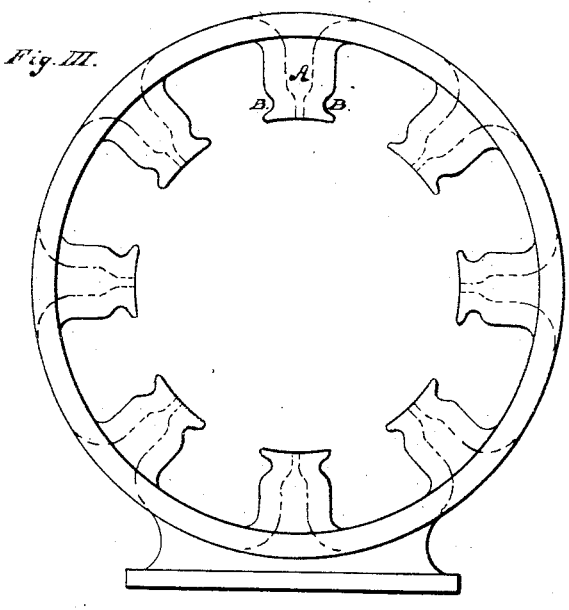
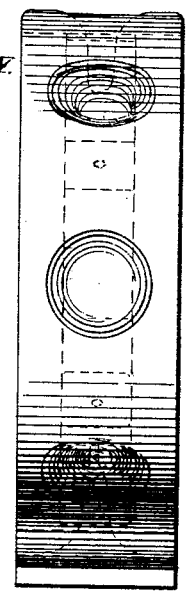
WITNESSES:
Arthur H. Eddy.
Arthur D. Newton.
Howard S. Rodgers
INVENTOR
BY Read & Price
his ATTORNEYS.

UNITED STATES PATENT OFFICE.

HOWARD S. RODGERS, OF HARTFORD, CONNECTICUT.

DYNAMO-ELECTRIC MACHINE OR MOTOR.

SPECIFICATION forming part of Letters Patent No. 512,843, dated January 16, 1894.

Application filed January 31, 1893. Serial No. 460,426. (No model.)

*To all whom it may concern:*

Be it known that I, HOWARD S. RODGERS, a citizen of the United States, residing at Hartford, in the county of Hartford and State of Connecticut, have invented certain new and useful Improvements in Dynamo-Electric Machines or Motors; and I do hereby declare the following to be a full, clear, and exact description of the invention, such as will enable others skilled in the art to which it appertains to make and use the same.

This invention relates to dynamo electric machines or motors, the object being to increase the efficiency and simplicity of construction of the field-magnets in such machinery and to enable the field-magnet coils to be readily removed in case of necessity. In the construction of dynamo electric machines or motors it is usual to provide the pole-pieces with horns by which the area of the polar field where it cuts the armature winding is increased and a better action of the machine promoted. As these horns or pole tips increase the width of the field-magnet core it is impossible after the magnets are wound to remove the field-magnet coils unless the tips are made removable, a structure which increases the magnetic resistance of the field-magnet circuit because of the joints involved, and involves structural difficulties which increase the expense of the machine. In my invention the pole tips or horns are formed integral with the field-magnet core, and the whole field-magnet structure may, if desired, be formed in one casting. I carry out my invention by forming an annular recess at the extremity of the pole-pieces, leaving the width of the pole face of such area that the field-magnet coil may be readily slipped on or off when desired. For the purpose of reducing the weight of the field-magnet the cores may be made hollow, which in a casting may be cored, or when the field-magnet is laminated may be punched in a suitable way to leave the pole-piece hollow internally.

The several features of novelty will be more particularly hereinafter described and will be definitely indicated in the claims appended to this specification.

In the accompanying drawings which illustrate the invention, Figure 1 is a side elevation of a field-magnet frame embodying the various features of my invention. Fig. 2 is an end elevation of the same. Fig. 3 is a side elevation of a multipolar frame provided with eight pole-pieces; and Fig. 4 is a side elevation of the same.

A represents the field-magnet cores, which, as shown, are provided with pole tips or horns by producing a recess at B. As indicated by dotted lines, the cores are provided with central openings to reduce the weight of the structure, the size of the openings being so limited that the magnetic conductivity of the core will be equal in capacity to the conductivity of the pole faces.

Figs. 1 and 2 show an organization adapted for a four-pole armature, and Figs. 3 and 4 one for an eight pole armature. It is of course not absolutely essential that the cores should be made hollow as indicated, but such construction is preferable for reducing the weight of the machine without injuriously reducing the magnetic conductivity of the field-magnet circuit. The annular recess B may be formed in any convenient way and may be simply a groove formed around the core, or the upper and lower surfaces of the core in the plane of rotation of the armature may be simply grooved, the remainder of the core being left smooth, the primary idea being, as is common in machines provided with pole tips or horns, to produce a more uniform distribution of the lines of force in the air gap between the face of the pole-piece and the armature.

The invention is particularly applicable to the class of machines provided with salient poles, such as indicated in the drawings.

Where the field-magnet cores are made of cast metal both the hollowing out and the reduction of diameter to form the pole tips may be produced in the operation of casting, and where the frame and cores are formed of laminated plates the plates may be suitably punched before being assembled.

Having thus described my invention, what I claim as new, and desire to secure by Letters Patent, is—

1. A dynamo electric machine or motor having its field-magnet cores provided with pole tips or horns lying within planes bounding the external surface of the cores, whereby the field-magnet coils may be put in position or removed without removal of the cores.

2. A dynamo electric machine or motor provided with field-magnet cores having pole tips or horns formed integral with the body of the cores and lying within planes bounding the external surface of the cores.

3. A dynamo electric machine or motor provided with a field-magnet frame having its cores provided with pole tips or horns formed integral with the frame and cores, said tips or horns lying within planes bounding the external surface of the cores, for the purpose set forth.

4. A dynamo electric machine or motor provided with field-magnet cores having pole tips or horns formed integral therewith and lying within planes bounding the external surface of the cores, said cores being formed hollow for reduction of weight.

In testimony whereof I affix my signature in presence of two witnesses.

HOWARD S. RODGERS.

Witnesses:
MILON E. BAIRD,
ARTHUR D. NEWTON.